United States Patent [19]

Hüttenhofer et al.

[11] Patent Number: 5,749,651
[45] Date of Patent: May 12, 1998

[54] COMBINED FEED AND MIXING DEVICE

[75] Inventors: Klaus Hüttenhofer, Heroldsberg; Wolfgang Herr, Friesen; Josef Sprehe, Fürth; Horst Spielmann, Baiersdorf, all of Germany

[73] Assignee: Siemens Aktiengesellschaft, Munich, Germany

[21] Appl. No.: 710,978

[22] Filed: Sep. 25, 1996

Related U.S. Application Data

[63] Continuation of PCT/DE95/00340 Mar. 13, 1995 published as WO95/26226 Oct. 5, 1995.

[30] Foreign Application Priority Data

Mar. 25, 1994 [DE] Germany .......... 44 10 237.2

[51] Int. Cl.$^6$ ................. B01F 3/02; B01F 5/06
[52] U.S. Cl. ................. 366/181.5; 366/337
[58] Field of Search .......... 366/181.5, 181.6, 366/336, 337, 340; 138/37, 39, 40, 42; 48/189.1, 189.4

[56] References Cited

U.S. PATENT DOCUMENTS

| | | | |
|---|---|---|---|
| 5,380,088 | 1/1995 | Fleischli et al. | 366/181.5 X |
| 5,423,608 | 6/1995 | Chyou et al. | 366/337 |
| 5,456,533 | 10/1995 | Streiff et al. | 366/337 X |
| 5,489,153 | 2/1996 | Berner et al. | 366/337 |
| 5,518,311 | 5/1996 | Althaus et al. | 366/181.5 |

FOREIGN PATENT DOCUMENTS

| | | |
|---|---|---|
| 0 167 060 A1 | 1/1986 | European Pat. Off. . |
| 2 341 040 | 9/1977 | France . |
| 35 05 354 A1 | 10/1985 | Germany . |
| 36 27 086 A1 | 2/1988 | Germany . |
| 36 37 395 A1 | 5/1988 | Germany . |
| 36 42 612 A1 | 6/1988 | Germany . |
| 88 10 887.2 | 12/1988 | Germany . |
| 88 14 405.4 | 2/1989 | Germany . |
| 38 11 636 C1 | 3/1989 | Germany . |
| 37 35 112 C2 | 4/1989 | Germany . |
| 41 09 101 A1 | 9/1992 | Germany . |

Primary Examiner—Charles E. Cooley
Attorney, Agent, or Firm—Herbert L. Lerner; Laurence A. Greenberg

[57] ABSTRACT

A flow duct conducts a gaseous second fluid medium in a given flow direction and has a given cross-sectional area and a given hydraulic diameter. A combined feed and mixing device for introducing a first fluid medium into the second fluid medium in the flow duct and for mixing the fluid media includes at least one tube conducting the first fluid medium and having from 0.05 to 10 feed orifices per $m^2$ of the given cross-sectional area. A mixing insert disposed downstream of the at least one feed orifice in the given flow direction is spaced apart from the feed orifices by a distance of from 0.05 to 3 times the given hydraulic diameter. The mixing insert has mixing elements being small relative to the given hydraulic diameter and being disposed in mutually parallel rows in a plane oriented at an angle to the given flow direction. The mixing elements of each of the rows are inclined relative to a plane in the same direction to one another and in opposite direction to the mixing elements of each adjacent row.

9 Claims, 2 Drawing Sheets

PRIOR ART

COMBINED FEED AND MIXING DEVICE

CROSS-REFERENCE TO RELATED APPLICATION

This application is a Continuation of International Application Serial No. PCT/DE95/00340, filed Mar. 13, 1995.

BACKGROUND OF THE INVENTION

Field of the Invention

The invention relates to a combined feed and mixing device for introducing a first fluid medium into a gaseous second fluid medium conducted in a flow duct in a flow direction and for mixing the fluid media, including at least one tube conducting the first fluid medium and having at least one feed orifice, and a mixing insert disposed downstream of the feed orifice in the flow direction, wherein given a cross-sectional area and a hydraulic diameter of the flow duct, from 0.05 to 10 feed orifices are provided per m$^2$ of the cross-sectional area, and a distance between the feed orifice and the mixing insert is from 0.05 to 3 times the hydraulic diameter.

Such a combined feed and mixing device is found in Published French Application 2 341 040, corresponding to U.S. Pat. No. 4,131,432.

In many industrial applications an addition of one liquid or gaseous mass stream to another liquid or gaseous mass stream that is as uniform as possible is necessary to achieve a high process efficiency. Thus, for example, for catalytic reduction by the selective catalytic reduction process (SCR process) of nitrogen oxides contained in exhaust gas or flue gas, it is necessary to add a reducing agent in gaseous form to the exhaust gas or flue gas stream to be denitrated, specifically upstream of the catalytic converter. An ammonia/air mixture is conventionally injected as a reducing agent into the flue gas, with an ammonia/air volumetric flow rate to be added being very small in comparison to the exhaust gas or flue gas flow rate. The ammonia/air volumetric flow rate to be added is conventionally about 2 to 5 per cent by volume of the exhaust gas or flue gas flow rate.

In order to be able to select the volume of catalyst necessary for the denitration of the exhaust gas or flue gas to be as low as possible, uniform utilization of the catalyst over the entire exhaust gas duct cross-section must be sought after. That fact makes it necessary to inject the ammonia/air mixture and mix it with the exhaust gas as uniformly as possible over the entire exhaust gas duct cross section.

Uniform addition and mixing of a relatively small liquid or gas stream to or with a relatively large liquid or gas stream is fluid-dynamically difficult and therefore technically highly complex. That problem is currently solved by a multiplicity of individually adjustable injection tubes including a multiplicity of nozzles having been installed in the exhaust gas duct in order to obtain a uniform distribution of the nozzles and thus of the ammonia/air mixture inlet points into the flue gas over the entire cross-section of the exhaust gas duct. A disadvantage of that solution is a pressure drop in the flue gas duct caused by the multiplicity of the injection tubes. Furthermore, that solution requires a very high expenditure in terms of apparatus with respect to the piping, the nozzles, the control valves and the overall addition control system. Moreover, adjusting such a system during start-up is very time-consuming and costly.

SUMMARY OF THE INVENTION

It is accordingly an object of the invention to provide a combined feed and mixing device, which overcomes the hereinafore-mentioned disadvantages of the heretofore-known devices of this general type and which achieves an introduction of a first fluid medium into a second fluid medium and a homogeneous distribution of the first fluid medium over an entire cross-section of a flow duct with negligible pressure drop, low expenditure in terms of apparatus and small amount of effort in start-up.

With the foregoing and other objects in view there is provided, in accordance with the invention, in an assembly including a flow duct conducting a gaseous second fluid medium in a given flow direction and having a given cross-sectional area and a given hydraulic diameter, a combined feed and mixing device for introducing a first fluid medium into the second fluid medium in the flow duct and for mixing the fluid media, comprising at least one tube conducting the first fluid medium, the at least one tube having from 0.05 to 10 feed orifices per m$^2$ of the given cross-sectional area; and a mixing insert disposed downstream of the at least one feed orifice in the given flow direction, the mixing insert being spaced apart from the feed orifices by a distance of from 0.05 to 3 times the given hydraulic diameter; the mixing insert having mixing elements being small relative to the given hydraulic diameter and being disposed in mutually parallel rows in a plane oriented at an angle to the given flow direction, and the mixing elements of each of the rows being inclined relative to a plane in the same direction to one another and in opposite direction to the mixing elements of each adjacent row.

The hydraulic diameter is defined in this case as four times the cross-sectional area of the flow duct divided by the circumference of the flow duct.

According to the invention, as a result of the low number of tubes and feed orifices disposed in the flow duct, the expenditure in terms of apparatus and the cost of introducing the fluid medium to be added are particularly low. At the same time, the pressure drop in the flow duct is also considerably decreased in comparison to the solutions known from the prior art. The use of the mixing insert disposed in the flow duct achieves a homogeneous distribution of the fluid medium which is introduced into the flue gas duct at only a few points in the fluid medium that is conducted by the flue gas duct. The pressure drop caused by the mixing insert can be considerably smaller, by the choice of a suitable mixing insert, than the pressure drop caused by a multiplicity of injection tubes.

In accordance with another feature of the invention, it has proved advantageous, especially in the construction of the combined feed and mixing device for fossil-fueled power stations having an electrical output of a few hundred megawatts, if about 0.1 to 1 feed orifice per m$^2$ of cross-sectional area is provided and/or if the distance between the mixing insert and the feed orifices is about 0.1 to 1 times the hydraulic diameter.

In accordance with a further feature of the invention, there are provided 0.01 to 5 and preferably 0.05 to 1 tubes per square meter of the cross-sectional area, which is advantageous with respect to a negligible pressure drop.

In order to provide a homogeneous distribution of the first fluid medium introduced into the second fluid medium, it is generally necessary that the fluid medium already present in the flow duct have a velocity distribution that is as uniform as possible over the entire cross-section of the flow duct. In accordance with an added feature of the invention, if a sufficiently homogeneous flow profile is not then present at the point of introduction of the first fluid medium, flow guides are provided upstream of the feed orifices and the mixing insert in the direction of flow of the second fluid medium. Such flow guides are, for example, baffles and similar devices.

In accordance with an additional feature of the invention, the mixing insert has from 0.5 to 50 of the mixing elements per m² of the given cross-sectional area.

In accordance with yet another feature of the invention, there is provided an insert subdividing the flow duct into part-ducts, one of the feed orifices and one of the mixing inserts being disposed in each of the part-ducts.

In accordance with a concomitant feature of the invention, the combined feed and mixing device according to the invention is used for the introduction of gaseous ammonia, e.g. an ammonia/air mixture, into a nitrogen oxide-containing gas mixture, e.g. the flue gas of fossil-fueled power stations or motor vehicle exhaust gases, and the mixing of the ammonia and the nitrogen oxide-containing gas mixture. As an alternative to the ammonia/air mixture, in principle any substance releasing ammonia, in particular an aqueous urea solution, can be used.

Although the invention is illustrated and described herein as embodied in a combined feed and mixing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
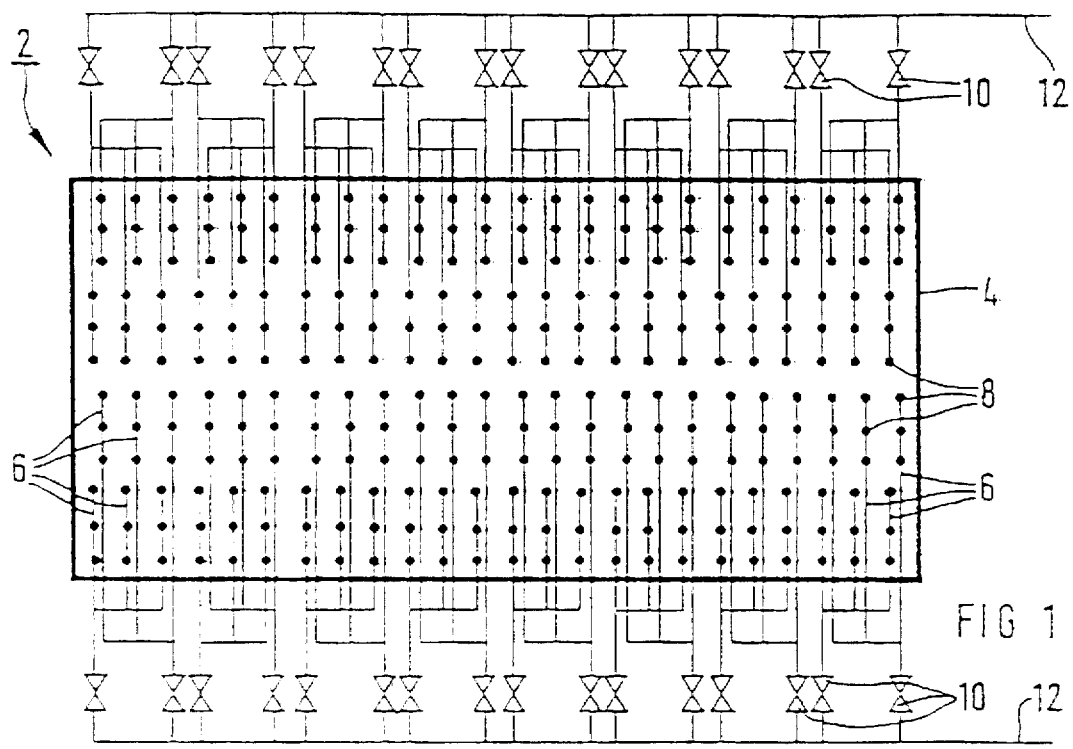
FIG. 1 is a diagrammatic, cross-sectional view of a conventional system for the injection and simultaneous homogeneous distribution of ammonia into a flue gas duct.

Referring now in detail to the figures of the drawings, in which the same parts have the same reference numerals, and first, particularly, to FIG. 1 thereof, there is seen a cross section of a flow duct 4 and a conventional system 2 for introducing ammonia into a flue gas flowing perpendicularly to the plane of the drawing. The system 2 includes a multiplicity of feed tubes 6 which are uniformly distributed in the flue gas duct 4 and have nozzle heads 8 as feed orifices. The injection tubes 6 are connected on the inlet side through an adjustable valve 10 to a feed line 12 for an ammonia/air mixture.

A non-negligible pressure drop which, for example, is at the cost of the electrical output of a power station, is caused by the multiplicity of the feed tubes 6 disposed in the flue gas duct 4. Likewise, the expenditure in terms of apparatus is very high. For example, in the case of a 600 MW power station, it can be about 30 to 50 injection tubes 6 each having a controllable valve 10 and a number of nozzles of about 1600 nozzle heads 8. Start-up and maintenance of such a system 2 is very time-consuming and costly.

Figure 2:
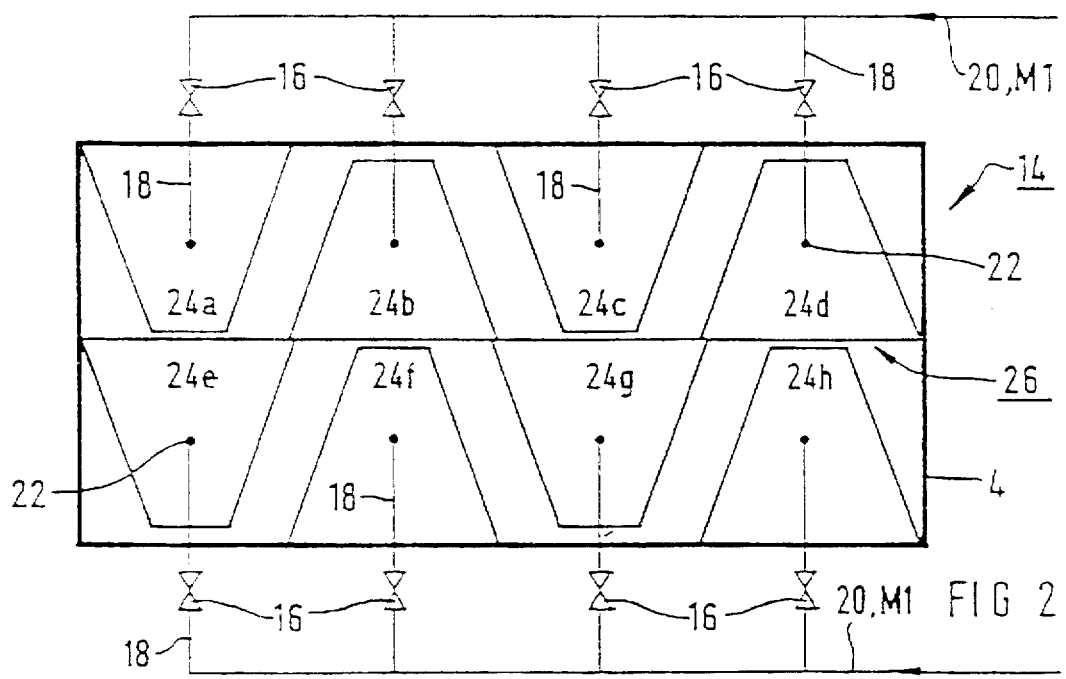
FIG. 2 is a cross-sectional view of a combined feed and mixing device according to the invention for the introduction of ammonia into a flue gas conducted in a flue gas duct.

A combined feed and mixing device 14 according to the invention is shown in FIG. 2. In the view shown in FIG. 2, eight injection tubes 18 are seen which are furnished with servo valves 16, which are connected on the inlet side to feed lines 20 for an ammonia/air gas mixture M1 and which open out on the outlet side into nozzle heads 22 provided as feed orifices.

In order to provide direct comparison of the device 14 according to the invention with the conventional injection system 2 known from the prior art and discussed with regard to in FIG. 1, the flow duct 4 known from FIG. 1 is indicated in FIG. 2. In the exemplary embodiment, the cross-section of this flow duct 4 is about 8 m², from which a hydraulic diameter of about 2.67 m results for a cross sectional shape of 2 m×4 m given in this case. A hydraulic diameter $d_{hydr}$ is defined as four times a cross-sectional area A divided by a circumference U of the flow duct 4.

In the diagrammatic illustration, eight mixing elements $24a$ to $24h$ are situated behind the nozzle heads. These mixing elements $24a$ to $24h$, which belong to a mixing insert 26, are trapezoidal and are each inclined downwards from the plane of the drawing towards the narrow edge of the trapezium. The angle of inclination with respect to the plane of the drawing can be between 10 and 60o in this case, and preferably between 30° and 45°. A fluid medium conducted in the flow duct 4 preferably flows perpendicularly to the selected plane of the drawing. Through the use of these mixing elements $24a$ to $24h$, both a local vortexing of the fluid medium with the ammonia/air gas mixture placed into the fluid medium and a mixing extending over the entire cross-section of the flow duct 4 are achieved. In order to provide a homogeneous distribution over the entire cross-section of the flow duct 4 of the ammonia/air gas mixture introduced into the fluid medium, it is advantageous if 0.5 to 50 mixing elements 24 are provided per m² of flow duct cross-section, with this number preferably being between 0.5 and 10 mixing elements per m².

Figure 3:
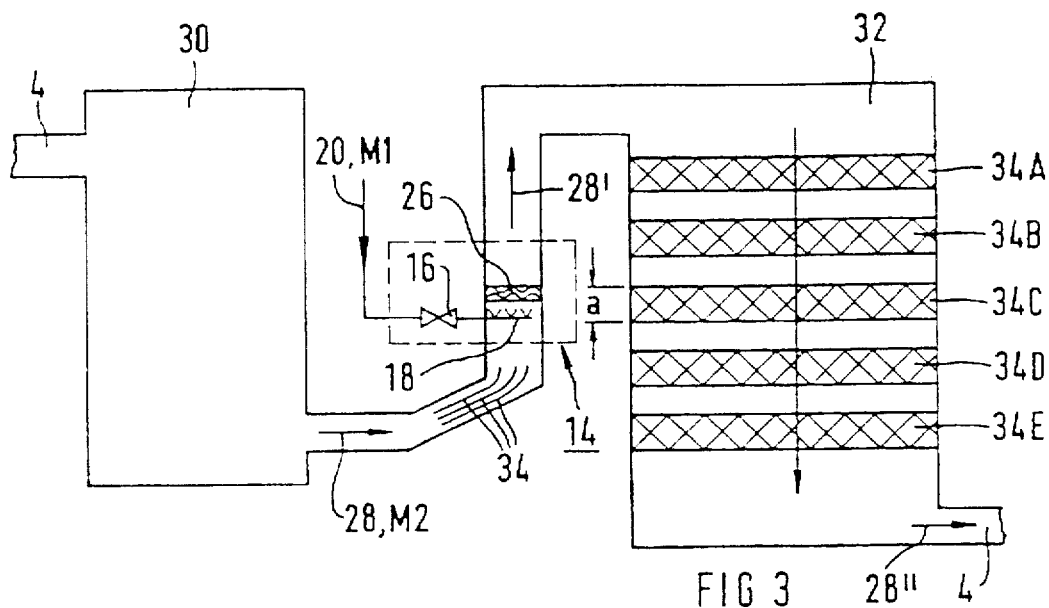
FIG. 3 is a cross-sectional view of a configuration of the combined feed and mixing device according to FIG. 2 in the flue gas line of a fossil-fueled 600 megawatt power station.

In the section diagrammatically illustrated in FIG. 3, there is seen a flue gas line 4 of a fossil-fueled power station, which is not further illustrated herein, and the combined feed and mixing device 14 according to FIG. 2 which is disposed between a steam generator 30 and a deNO$_x$ reactor 32 in the direction of flow of a fluid medium M2 that is present in this case and specifically a nitrogen-oxide-containing flue gas 28.

During operation of the power station, the nitrogen oxide-containing flue gas 28 flows from the steam generator 30 past flow baffle plates 34 disposed in the flue gas duct to the combined feed and mixing device 14. The flow baffle plates 34 serve to homogenize the velocity profile of the flue gas 28 so that the flue gas 28 reaches the injection tubes 18 having about the same velocity over the entire cross-section of the flue gas duct 4.

Based on the volumetric flow rate of the flue gas 28, about 2 to 5 per cent by volume of an ammonia/air mixture conducted through the feed line 20 and added by the valve 16 is introduced into the flue gas 28 at the feed tubes 18. In the mixing insert 26 disposed downstream of the feed tubes 18 in the direction of flow of the flue gas 28, the ammonia/air gas mixture is mixed with the flue gas 28 so that a flue gas 28' containing homogeneously added ammonia is fed to the deNO$_x$ reactor 32.

The nitrogen oxides contained in the flue gas 28', together with the ammonia, are catalytically converted to nitrogen and water at catalysts 34A to 34E, which are so-called deNO$_x$ catalysts that are disposed in planes one above the other in the deNO$_x$ reactor 32, by contacting the catalysts 34A to 34E. A nitrogen oxide-free and ammonia-free flue gas 28" therefore leaves the deNO$_x$ reactor 32. Due to the homogeneous distribution of the ammonia in the flue gas 28, the catalysts 34A to 34E are evenly utilized over the entire cross section.

The distance of the mixing insert 26 from the feed tubes 18 generally should be between 0.05 and 3 $d_{hydr}$. This distance is preferably between 0.1 and 1 $d_{hydr}$.

Figure 4:
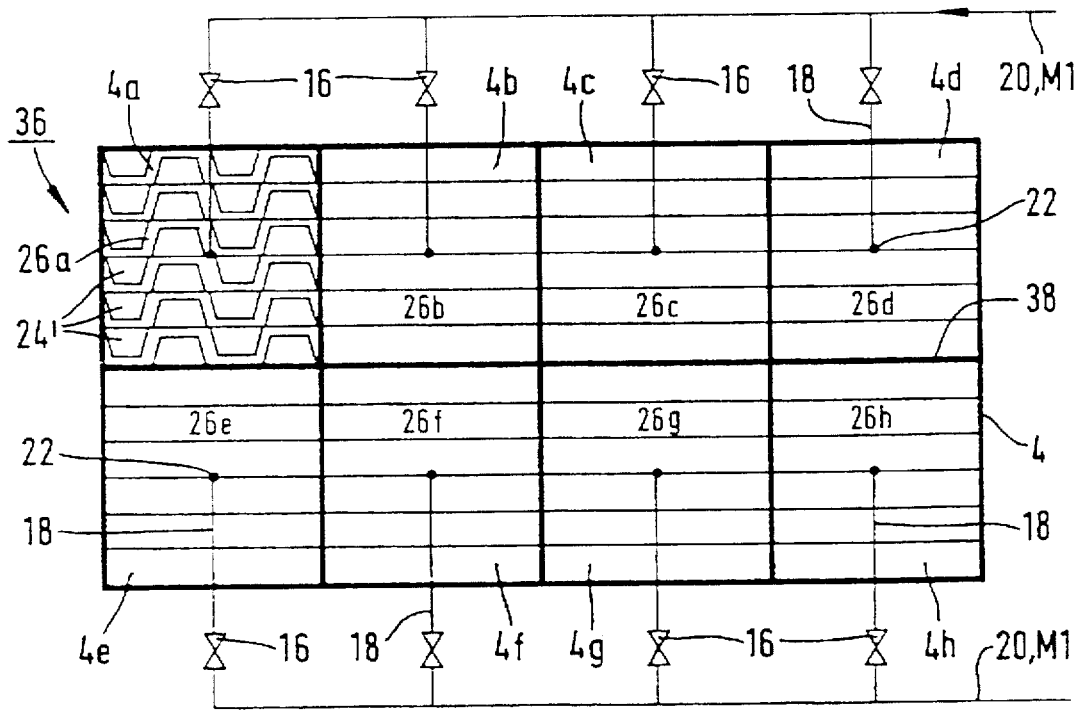
FIG. 4 is a cross-sectional view of a further combined feed and mixing device according to the invention having an insert for subdivision of the flow duct.

FIG. 4 shows a further embodiment of a combined feed and mixing device 36. One can again recognize the parts known from FIG. 2, namely the flue gas duct 4, servo valves 16, injection tubes 18, feed line 20 for an ammonia/air gas mixture M1 and nozzle heads 22. An insert 38 is additionally provided which subdivides the flow duct 4 into eight part-ducts 4a to 4h over a length of about 3 $d_{hydr}$. Moreover, in this manner, a nozzle head 22 provided as a feed orifice and a mixing insert 26a to 26h which in principle has the same construction in comparison to FIG. 2 but smaller, is assigned to each part-duct 4a to 4h. Each of these mixing inserts 26a to 26h includes 24 trapezoidal mixing elements 24'. For reasons of clarity, the mixing elements 24' are only shown for the mixing insert 26a. Of course, the other mixing inserts 26b to 26h also have the same number and configuration of mixing elements 24' as the mixing insert 26a.

Through the use of the insert 38 provided herein, a more complete and more intensive mixing of the ammonia/air gas mixture M1 that is introduced in this case, with a fluid medium M2, e.g. the nitrogen oxide-containing flue gas 28 according to FIG. 3, that is conducted in the flow duct 4, is possible. However, extensive concentration equalization of any NO$_x$ or NH$_3$ inclined or scaly layers that are present is achieved more easily with the mixing insert 26 according to FIG. 2. A decision as to which variant is selected for the combined feed and mixing device will therefore depend on the individual case.

We claim:

1. In an assembly including a flow duct conducting a gaseous second fluid medium in a given flow direction and having a given cross-sectional area and a given hydraulic diameter, a combined feed and mixing device for introducing a first fluid medium into the second fluid medium in the flow duct and for mixing the fluid media, comprising:

at least one tube conducting the first fluid medium, said at least one tube having from 0.05 to 10 feed orifices per m$^2$ of the given cross-sectional area;

a mixing insert disposed downstream of said feed orifices in the given flow direction, said mixing insert being spaced apart from said feed orifices by a distance of from 0.05 to 3 times the given hydraulic diameter; and said mixing insert having mixing elements being small relative to the given hydraulic diameter and being disposed in mutually parallel rows in a plane oriented at an angle to the given flow direction, and said mixing elements of each of said rows being inclined relative to a plane in the same direction to one another and in opposite direction to said mixing elements of each adjacent row.

2. The combined feed and mixing device according to claim 1, wherein said at least one tube has from 0.1 to 1 feed orifices per m$^2$ of the given cross-sectional area.

3. The combined feed and mixing device according to claim 1, wherein said distance between said mixing insert and said feed orifices is 0.1 to 1 times the given hydraulic diameter.

4. The combined feed and mixing device according to claim 1, wherein said at least one tube is from 0.05 to 5 tubes per m$^2$ of the given cross-sectional area.

5. The combined feed and mixing device according to claim 4, wherein said at least one tube is from 0.1 to 1 tube per m$^2$ of the given cross-sectional area.

6. The combined feed and mixing device according to claim 1, including flow baffle elements disposed upstream of said feed orifices and said mixing insert as seen in the given flow direction of the second fluid medium.

7. The combined feed and mixing device according to claim 1, wherein said mixing insert has from 0.5 to 50 of said mixing elements per m$^2$ of the given cross-sectional area.

8. The combined feed and mixing device according to claim 1, including an insert subdividing the flow duct into part-ducts, one of said feed orifices and one of said mixing inserts being disposed in each of said part-ducts.

9. A method for mixing gases, which comprises:

conducting a nitrogen-oxide-containing gas flow in a given direction of a flow duct and the flow duct having a given cross-sectional area and a given hydraulic diameter;

providing from 0.05 to 10 feed orifices per m$^2$ of the given cross-sectional area in at least one tube with one end of the at least one tube disposed in the flow duct;

providing a mixing insert having mixing elements downstream of the feed orifices in the given flow direction and spacing the mixing insert from the feed orifices by a distance of from 0.05 to 3 times the given hydraulic diameter;

placing the mixing elements in mutually parallel rows in a plane oriented at an angle to the given flow direction and inclining the mixing elements of the mutually parallel rows relative to a plane in the same direction to one another and in opposite direction to the mixing elements of each adjacent row; and introducing a gaseous ammonia flow to the at least one tube for mixing the gaseous ammonia flow with the nitrogen-oxide-containing gas flow in the mixing insert.

* * * * *